（12）United States Patent
Tumminaro

(10) Patent No.: US 7,029,045 B2
(45) Date of Patent: Apr. 18, 2006

(54) DOE ANTLERS

(76) Inventor: Michael Tumminaro, 707 E. Church St., Plano, IL (US) 60545

( * ) Notice: Subject to any disclaimer, the term of this patent is extended or adjusted under 35 U.S.C. 154(b) by 0 days.

(21) Appl. No.: 10/448,774

(22) Filed: Sep. 9, 2003

(65) Prior Publication Data

US 2005/0052039 A1    Mar. 10, 2005

(51) Int. Cl.
*B65G 7/12*    (2006.01)
(52) U.S. Cl. .................... 294/15; 294/150; 294/153
(58) Field of Classification Search .............. 294/15, 294/16, 149, 150, 152, 153, 156, 31.2, 119.2; 224/921; 452/189, 190; 119/760, 766, 769, 119/856
See application file for complete search history.

(56) References Cited

U.S. PATENT DOCUMENTS

| 1,420,546 | A | * | 6/1922 | Hermelink Jr. et al. | ....... 294/15 |
| 4,153,189 | A | * | 5/1979 | Hughes | ...... 294/143 |
| 4,243,164 | A | * | 1/1981 | Burlison et al. | ........... 294/146 |
| 4,460,028 | A | * | 7/1984 | Henry | .......... 144/366 |
| 4,828,307 | A | * | 5/1989 | Sokol et al. | ............ 452/192 |
| 5,145,224 | A | * | 9/1992 | Welk | ............. 294/2 |

* cited by examiner

*Primary Examiner*—Dean J. Kramer
(74) *Attorney, Agent, or Firm*—Thomas G. Raffin; Claude T. Anderson

(57) ABSTRACT

A Doe Antlers is a device designed for retrieving wild game animals such as deer or other animals of similar size. Doe Antlers consists of a yoke, yoke handles, an adjustment fastener, a hook, and hand grips. The yoke can be manufactured of tubular or solid material such as metals including but not limited to steel, aluminum, titanium, and other materials such as composites, graphites, pultruded fiberglass, and etcetera. The adjustable fastener is a series of links joined together into a chain permanently fastened at one end and having a hook fastener at the other end. The yoke and handles constitute a single unit with a handle placed at both ends of the yoke. The handles may consist of rubber or other similar material over the yoke body, or they may be knurled steel for ease of use. The fastener is designed to lock the game animal's head securely into the yoke, allowing two people to easily move the game animal to the desired location.

1 Claim, 2 Drawing Sheets

DOE ANTLERS

BACKGROUND OF THE INVENTION

1. Field of the Invention

The present invention relates to towing devices and particularly to game towing devices.

2. Description of the Prior Art

The following U.S. patents are illustrative of the field of the present invention:

| Inventor | U.S. Pat. No. |
| --- | --- |
| McCarthy et al | 6,006,968 |
| Schmitt | 6,533,532 |
| Gonzalez | 4,759,578 |
| Whatley | 4,706,858 |
| Hayden | 4,567,853 |
| Bensette | 4,431,121 |
| McGee | 4,132,427 |
| Rich | 3,912,290 |

The patent of McCarthy (U.S. Pat. No. 6,006,968) discloses a harness, collar and towing structure; although the yoke and collar achieve the same results, the collar requires straps to be attached not only to the collar but also to the other points of attachment to the person moving the animal. The straps do not offer the person pulling the animal a rigid handle at the animal to be able to maneuver the animal around obstacles or to keep the animal's head from dragging and catching on debris such as branches, logs, bushes and rocks. The straps could also be caught in debris such as thorns which can imbed themselves, causing injury to the carrying party when the person is removing said straps. This invention also teaches that it can be used by one or two people; however the weight of the towed animal plus the ground friction makes a one person carry of this type extremely difficult. With two people, the people would have to be extremely close to one another allowing them to interfere with each other while dragging. This invention also has many parts which must be assembled in the field—parts that can be lost, tangled or broken.

The patent of Schmitt (U.S. Pat. No. 6,533,532 B1) discloses a carrying system and a hoisting apparatus. However this is where the similarity between the two systems ends, as Doe Antlers is a device solely used for transporting game animals or small logs. The patent of Schmitt describes a system with a platform, a hoisting device and a yoke for possible attachment to a person. This carrying device is also used for adjustment of support legs. Doe Antlers does not incorporate these legs. The handles on this carrying device are pivotal. The handles on the Doe Antlers are stationary, and will not function properly if pivotal.

The patent of Gonzales (U.S. Pat. No. 4,759,578) discloses an adjustable frame for placing objects on such as boxes for moving said objects up and down uneven terrain or stairs. This does not provide for attaching the object as in the present invention, and does not lend itself to easy storage while retrieving game.

The patent of Whatley (U.S. Pat. No. 4,706,858) discloses a piece of clothing. or a carpet which is placed around the horns or body of the animal which is then dragged over the ground. The present invention does not require horns, and is not required to be worn.

The patent of Hayden (U.S. Pat. No. 4,567,853) discloses an improvised sled and cot structure which is pulled along the ground on skids. Not only will the sled get caught on corners and low brush, this is a large device to carry in the woods, unlike the present invention.

The patent of Bensette (U.S. Pat. No. 4,431,121) discloses a harness worn by the person and then attached to the game animal. This allows the animal to hit the hunter in the lower back region or legs when pulling downhill. There is no direct control of the animal as in the present invention.

The patent of Rich (U.S. Pat. No. 4,132,427) discloses a sled with multiple attachment points and head rests for mounting the animal and then pulling said animal. Again, this does not provide the amount of control the present invention presents, nor does it allow direct movement. This sled also is quite large and may be broken in the field.

In comparison to the yokes of old, these yokes were large and made for the purpose of plowing fields and other agricultural needs by hooking the yokes on oxen and other animals. These also are not one-piece articles with handles as in the present invention. The yokes for carrying buckets are similar however they do not have the fastener nor do they have handles.

BACKGROUND OF THE PRESENT INVENTION

Hunters have for years searched in vain for a device to retrieve downed game from the field without problems or interferences. A Doe Antlers is a device designed for retrieving wild game animals such as deer or other animals of similar size. The Doe Antlers consists of a yoke, yoke handles, an adjustment fastener, a hook, and hand grips. The yoke can be manufactured of tubular or solid material such as metals including but not limited to steel, aluminum, titanium, and other materials such as composites, graphites, pultruded fiberglass, PVC, and etcetera. The adjustable fastener is a series of links joined together into a chain permanently fastened at one end and having a hook fastener at the other end. The yoke and handles constitute a single unit with a handle placed at both ends of the yoke. The handles may consist of rubber or other similar material over the yoke body, or they may be knurled steel for ease of use. The fastener is designed to lock the game animal's head securely into the yoke, allowing two people to easily move the game animal to the desired location. The links in the fastening device are what makes the fastener adjustable. Doe Antlers offers simplicity as there are no straps, no back packs, no buckled, no collars and nothing to assemble in the field. The only requirement is to secure the animal with a few motions and move the animal. This invention is compact and complete in itself.

The form of the Doe Antlers with holding means specifically allows the fixing of the yoke to the neck of a deer below the head of a deer to easily maintain this hold as the deer is dragged. This is different from other inventions as the Doe Antlers uses only two parts for ease and rapidity of movement.

SUMMARY OF THE PRESENT INVENTION

A primary object of the invention is to provide a means of moving large game animals that will overcome the limitations of the shortcomings of the prior art.

Another object of the present invention is to provide a game towing assembly that has one primary part.

An additional object is to provide a game towing yoke that is lightweight and can be used by two people to tow game animals from any most any location to most any other location with no major problems.

A further object is to provide a game towing yoke that is simple and easy to use.

A still further object is to provide a game towing yoke that is economical in cost to manufacture and therefore less costly to the ultimate user.

Another object of the invention is the ability to capture logs, lumber or piping and move them easily with quick, deft movements.

DETAILED DESCRIPTION OF THE PREFERRED EMBODIMENT OF THE PRESENT INVENTION

The detailed embodiment of the present invention is disclosed herein, however, it is to be understood that the disclosed embodiment is exemplary of the invention, which may be embodied in various forms. The details disclosed herein are not to be interpreted as limited, but merely as the basis for the claims and as a basis for teaching one skilled in the art how to make and/or use the invention.

Figure 1:
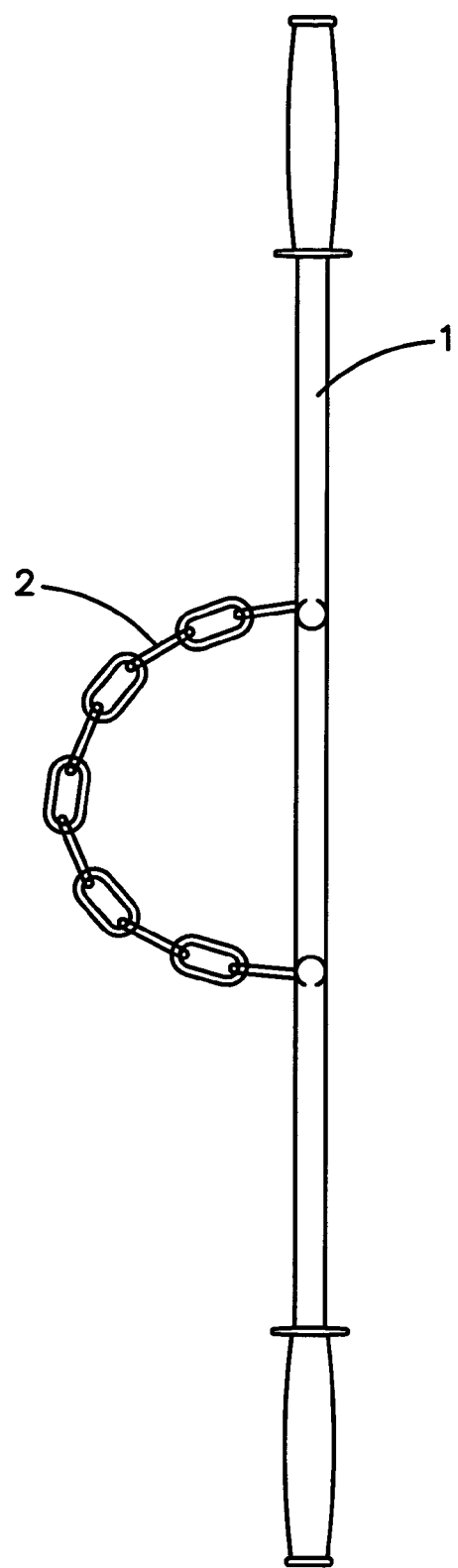
FIG. 1 is a plan drawing of the invention in a ready to use position.

Referring now to the drawings, particularly FIG. 1, the present invention will be seen to relate to a yoke generally, with yoke 1 being the primary lifting and support mechanism, and the chain 2 being the primary holding mechanism.

Figure 2:
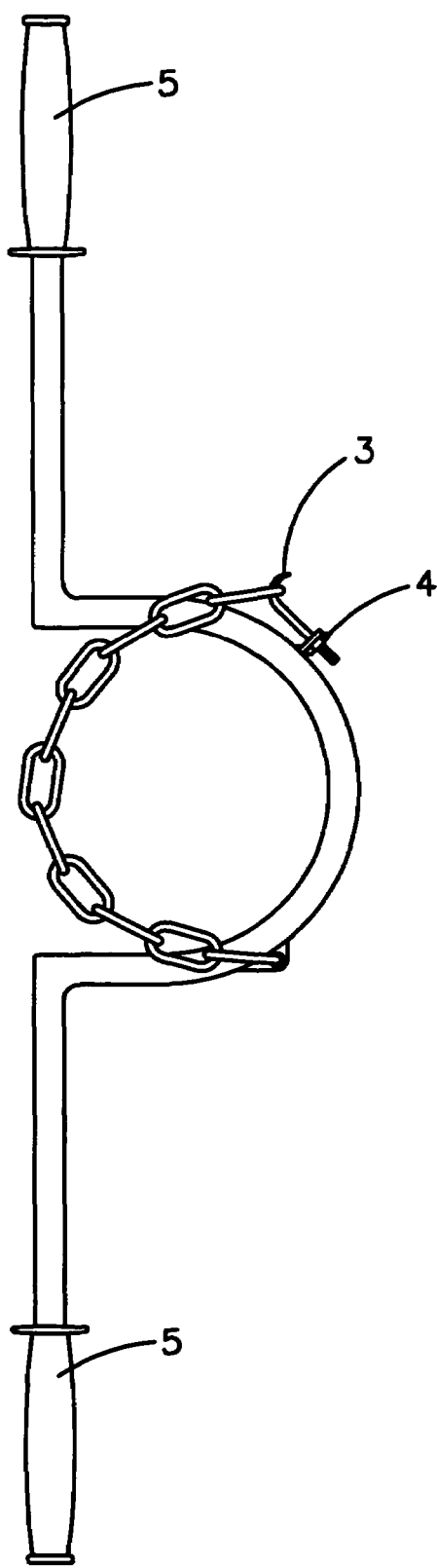
FIG. 2 is an elevation drawing of the invention showing how the fastener is connected.

FIG. 2 clearly shows the hook bolt attachment point 3 for the said chain, which is slidably attached through a fixed mounted plate 4 with a central hole for moveably supporting said hook bolt. At the other end of said bolt not having the hook, a wing nut is attached to said bolt for taking the slack out of said chain. This elevation drawing also indicates the areas where the handles 5 are located.

The primary yoke is recommended to be constructed of tubular steel or aluminum, however pultruded fiberglass or composite materials can also be used.

I claim:

1. A method for retrieving a deer which comprises the steps of:

positioning a head of a deer, into a yoke, the yoke being rigid and having a curved middle portion between a pair of handles;

engaging the head of the deer between the yoke at the curved middle portion and a chain, the chain having an end fixedly attached to the yoke and an end removably attached to the yoke;

rapidly adjusting the chain removable end to tightly secure the head of the deer to the yoke;

grasping the handles on the yoke, easily manipulating the deer as it is being retrieved.

* * * * *